US005135209A

United States Patent [19]

Penny

[11] Patent Number: 5,135,209

[45] Date of Patent: Aug. 4, 1992

[54] PIPE CLAMP APPARATUS

[76] Inventor: Thomas H. Penny, 108 N. Second St., P.O. Box 294, Decherd, Tenn. 37324

[21] Appl. No.: 790,824

[22] Filed: Nov. 12, 1991

[51] Int. Cl.[5] ............ B23Q 1/04

[52] U.S. Cl. ............ 269/249; 269/268; 269/282; 269/283; 269/902

[58] Field of Search ............ 269/249, 282, 283, 268, 269/902

[56] References Cited

U.S. PATENT DOCUMENTS

| | | | |
|---|---|---|---|
| 3,403,901 | 10/1968 | Servadia | 269/249 |
| 3,767,183 | 10/1973 | Van Gelder | 269/283 |
| 3,934,316 | 1/1976 | Driscoll | 269/244 |
| 4,363,475 | 12/1982 | McCarty | 269/249 |

*Primary Examiner*—Robert C. Watson
*Attorney, Agent, or Firm*—Leon Gilden

[57] ABSTRACT

An apparatus arranged for selective mounting of plate-like coaxially aligned clamping plates, or alternatively the use of "V" shaped brackets mounted in a coaxially aligned relationship to clamp a pipe therebetween, wherein the brackets each include recesses formed at each side edge thereof, wherein the recesses are aligned relative to one another when secured together to provide access to a pipe joint positioned within the recesses for a machining procedure and the like.

2 Claims, 5 Drawing Sheets

PRIOR ART

PIPE CLAMP APPARATUS

BACKGROUND OF THE INVENTION

1. Field of the Invention

The field of invention relates to "C" clamp structure, and more particularly pertains to a new and improved pipe clamp apparatus wherein a pipe joint is arranged for access by a machine procedure and the like.

2. Description of the Prior Art

"C" clamps of various types have been used throughout the prior art for the securement of workpieces. Such structure is exemplified in U.S. Pat. No. 4,823,636 to Suska wherein the "C" clamp includes one of the rods including a wrench flat to accommodate a box wrench and the like to apply application of force through the use of a box wrench to one of the "C" clamp faces.

U.S. Pat. No. 4,691,907 to Yang sets forth "C" clamp structure to accommodate a regular shaped workpiece.

U.S. Pat. No. 4,828,241 to Yang sets forth opposed clamping jaws in a generally "C" clamped arrangement to accommodate regular workpieces wherein the jaw includes articulated legs.

U.S. Pat. No. 4,770,401 to Donaldson sets forth an electrically powered screw member to permit mechanical actuation through the motor drive of the jaws of a "C" clamp structure.

As such, it may be appreciated that there continues to be a need for a new and improved pipe clamp apparatus as set forth by the instant invention which addresses both the problems of ease of use as well effectiveness in construction and in this respect, the present invention substantially fulfills this need.

SUMMARY OF THE INVENTION

In view of the foregoing disadvantages inherent in the known types of "C" clamp structure now present in the prior art, the present invention provides a pipe clamp apparatus wherein the same utilizes opposed "V" shaped brackets to clamp adjacent terminal ends of a plurality of pipes together. As such, the general purpose of the present invention, which will be described subsequently in greater detail, is to provide a new and improved pipe clamp apparatus which has all the advantages of the prior art "C" clamp structure and none of the disadvantages.

To attain this, the present invention provides an apparatus arranged for selective mounting of plate-like coaxially aligned clamping plates, or alternatively the use of "V" shaped brackets mounted in a coaxcially aligned relationship to clamp a pipe therebetween, wherein the brackets each include recesses fromed at each side edge thereof, wherein the recesses are aligned relative to one another when secured together to provide access to a pipe joint positioned within the recesses for a machining procedure and the like.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe clamp apparatus which has all the advantages of the prior art "C" clamp structures and none of the disadvantages.

It is another object of the present invention to provide a new improved pipe clamp apparatus which may be easily and efficiently manufactured and marketed.

It is a further object of the present invention to provide a new and improved pipe clamp apparatus which is of a durable and reliable construction.

An even further object of the present invention is to provide a new and improved pipe clamp apparatus which is susceptible of a low cost of manufacture with regard to both materials and labor, and which accordingly is then susceptible of low prices of sale to the consuming public, thereby making such pipe clamp apparatus economically available to the buying public.

Still yet another object of the present invention is to provide a new and improved pipe clamp apparatus which provides in the apparatuses and mehtods of the prior art some of the advantages thereof, while simultaneously overcoming some of the disadvantages normally associated therewith.

These together with other objects of the invention, aling with teh various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 15 is an orthographic view of a slotted connection illustrating a modified aspect of the invention, wherein a slotted mounting plate utilizing a swivel connection is mounted to a conventional forward distal end of a "C" shaped clamp.

DESCRIPTION OF THE PREFERRED EMBODIMENT

Figure 1:
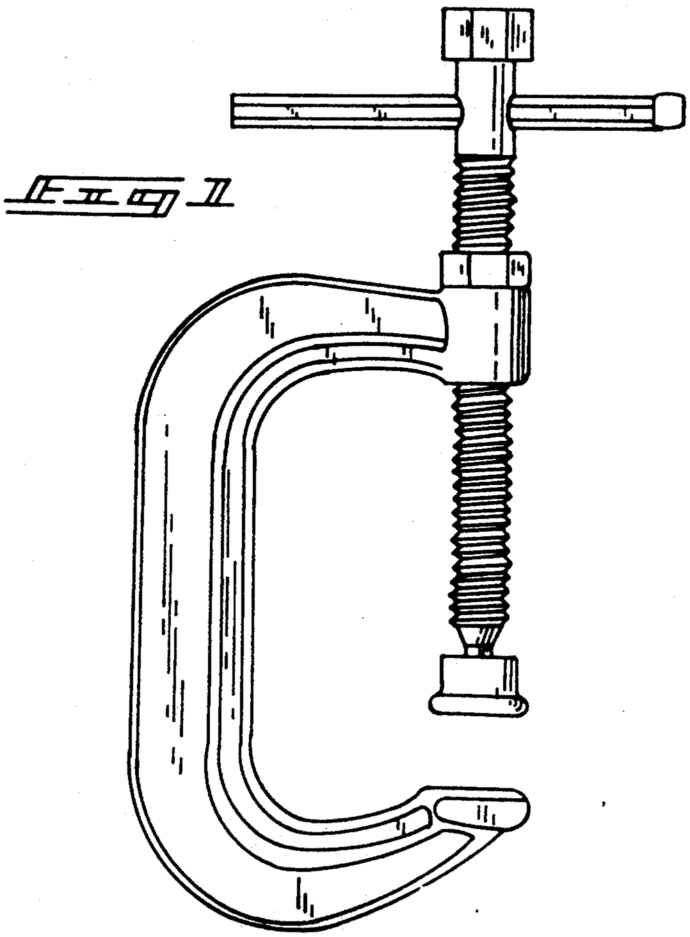
FIG. 1 is an orthographic side view of a prior art "C" clamp structure.

With reference now to the drawings, and in particular to FIGS. 1 to 15 thereof, a new and improved pipe clamp apparatus embodying the principles and concepts of the present invention and generally designated by the reference numeral 10 will be described.

Figure 2:
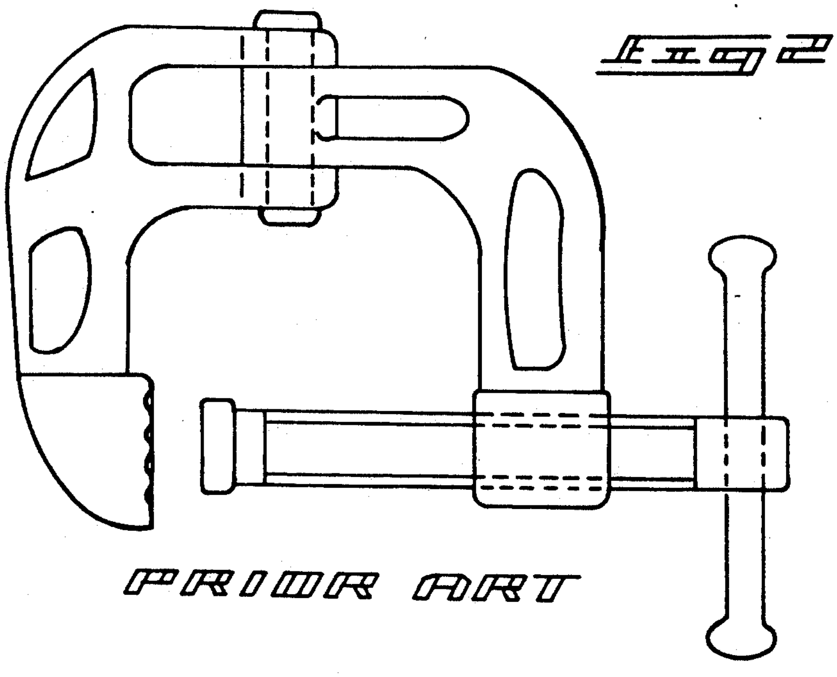
PRIOR ART FIG. 2
FIG. 2 is an orthographic side view of a further example of a prior art "C" clamp structure.
Figure 3:
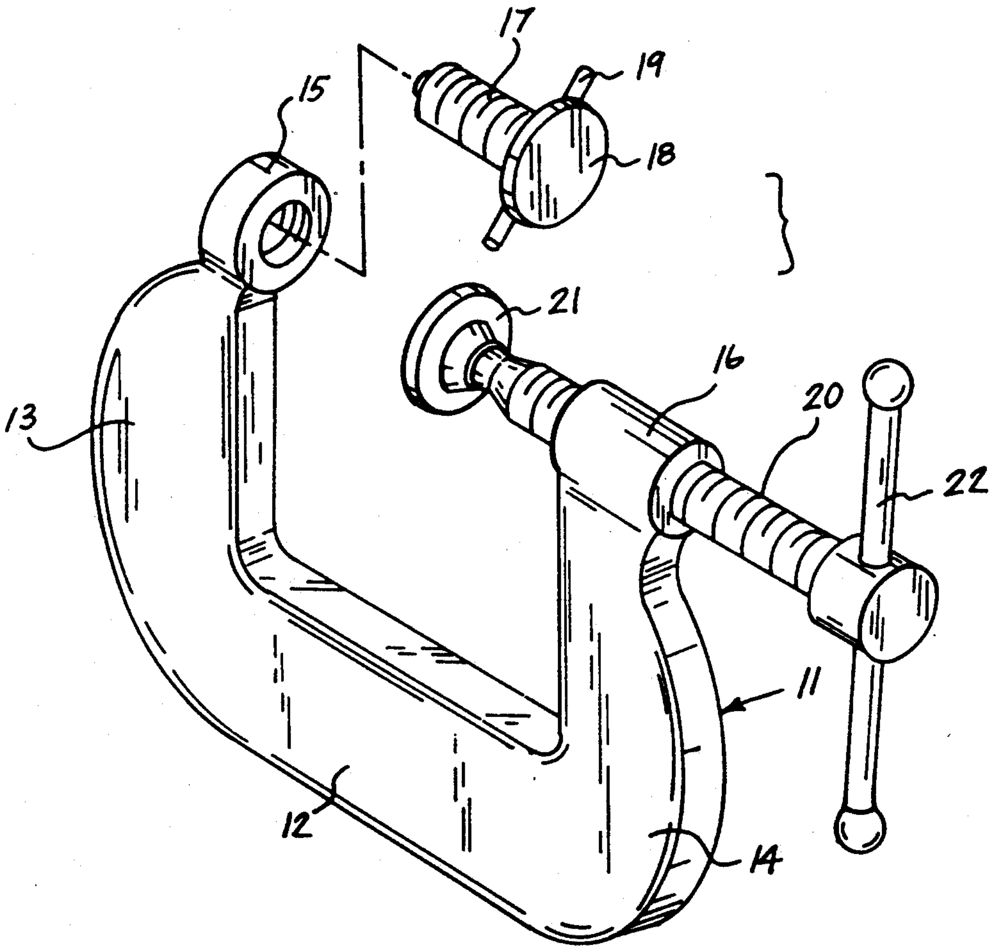
FIG. 3 is an isometric illustration of the instant invention in a first configuration.
Figure 4:
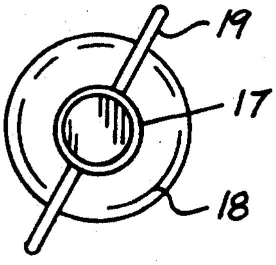
FIG. 4 is an orthographic rear end view of the first clamping plate utilized by the invention.
Figure 5:
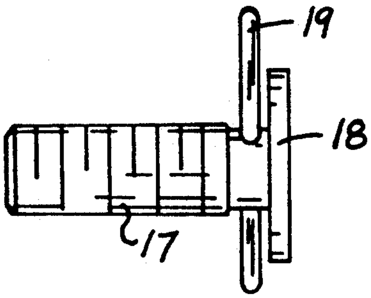
FIG. 5 is an orthographic side iew of the first clamping plate.
Figure 7:
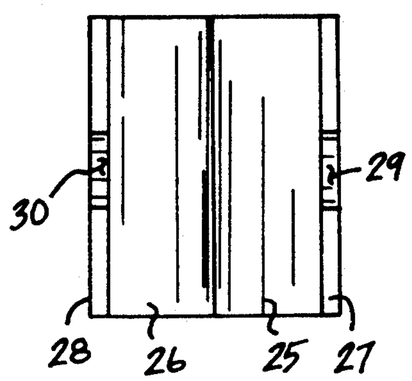
FIG. 7 is a frontal orthographic view of first "V" shaped bracket.
Figure 8:
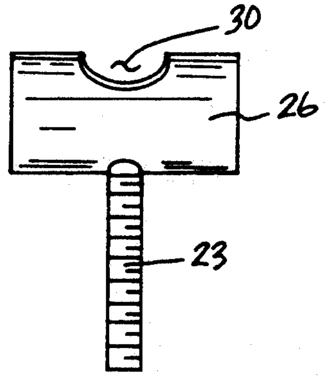
FIG. 8 is an orthographic side view of the first "V" shaped bracket.
Figure 9:
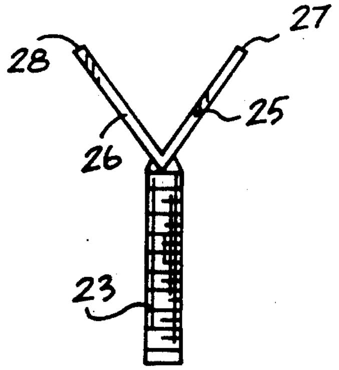
FIG. 9 is an orthographic end view of the first "V" shaped bracket.
Figure 10:
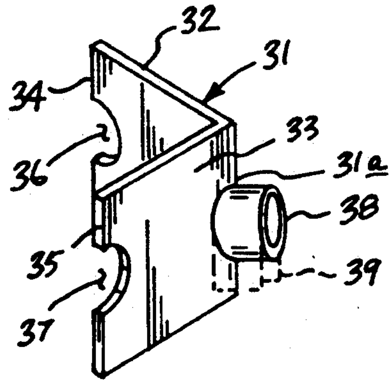
FIG. 10 is a isometric illustration of the second "V" shaped bracket.
Figure 11:
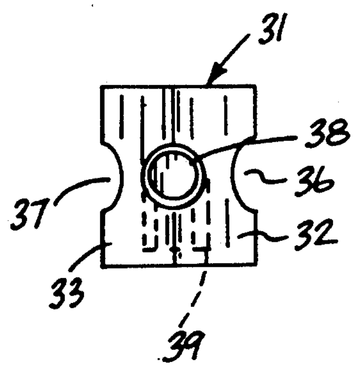
FIG. 11 is an orthographic rear view of the second "V" shaped bracket.
Figure 5:
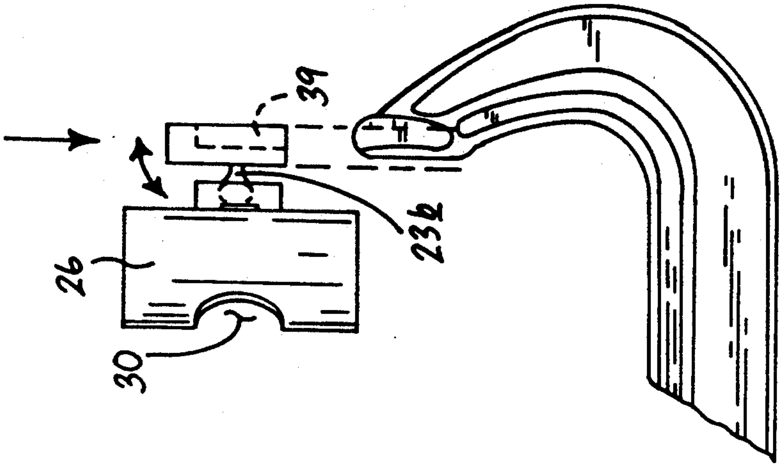

The FIGS. 1 and 2 are illustrative of the prior art U.S. Pat. Nos. 4,823,636 and 4,691,907 respectively to illustrate prior art "C" clamp structure, wherein the "C" clamp structure of FIG. 1 utilizes a wrench flate surface at an upper terminal end of the movable jaw, wherein the apparatus of FIG. 2 illustrates a pivotal inter-relationship between the legs of the "C" clamp structure to accommodate irregular articles.

More specifically, the pipe clamp apparatus 10 of the instant invention essentially comprises a "C" clamp structure 11 including a central shank 12, with a first leg 13 and a second leg 14 mounted orthogonally relative to the central shank 12 at opposed distal ends thereof, wherein the first and second legs are in parallel coextensive relationship relative to one another orthogonally oriented relative to the central shank 12. The first leg 13 includes a first threaded bore 15, with the second leg including a second threaded bore 16, wherein the first and second threaded bores are in a coaxially aligned relationship relative to one another and whose bores are parallel to the central shank 12 and orthogonally oriented relative to the first and second legs 13 and 14. A first threaded rod 17 is removably received within the first threaded bore 15, including a first threaded rod plate 18 orthogonally oriented relative to the first threaded rod 17. A handle bar 19 integrally mounted to the rod 17 is diametrically directed therethrough adjacent the first threaded rod plate 18 to accommodate enhanced manual manipulation of the first threaded rod and access its removal relative to the first threaded bore 15. A second threaded rod 20 is threadedly received within the second bore 16 and includes a second threaded rod plate 21 defined by a predetermined diameter formed at a forward distal end of the second threaded rod 20, with a second threaded rod handle 22 mounted at a rear distal end of the second threaded rod 20 to capture the second threaded rod 20 at its forward distal ends to the second threaded bore 16.

Reference to FIGS. 6–9 illustrate the use of a third threaded rod 23 medially intersecting a first "V" shaped bracket 24 that is formed by respective first and second bracket plates 25 and 26 tuned together to define an acute angle therebetween. The third rod 23 is arranged to intersect an intersection of the first and second bracket plates 25 and 26 set forth as first intersection 23a, with the first and second bracket plates 25 and 26 projecting forwardly of the first intersection 23a and the third threaded rod 23. The respective first and second bracket plates 25 and 26 include respective first and secoond plate side edges 27 and 28 that are arranged in a parallel and coextensive relationship relative to one another at side edges of the first and second plates, and include respective first and second recesses 29 and 30 positioned medially of the first and second plate side edges 27 and 28.

Figure 6:
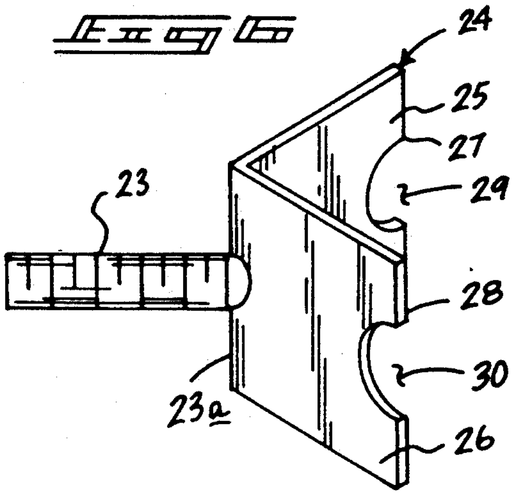
FIG. 6 is an isometric illustration of the first "V" shaped brackeet utilized by the invention.
Figure 6A:
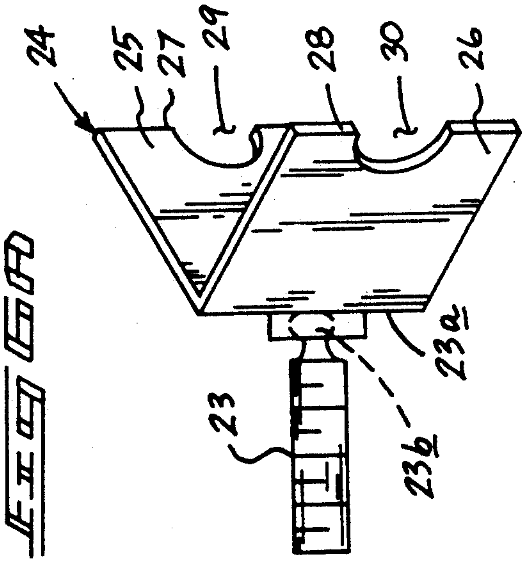
FIG. 6a is a modification of the "V" shaped bracket utilizing a swivel connection relative to a threaded rod.
Figure 12:
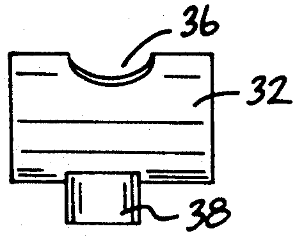
FIG. 12 is an orthographic side view of the first "V" shaped bracket.
Figure 13:
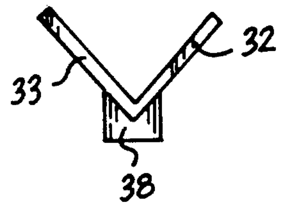
FIG. 13 is an orthographic end view of the first "V" shaped bracket.

FIG. 6a illustrates the use of a swivel connection 23b utilized in association with the threaded rod 23 to permit angular orientation of the "V" shaped bracket 24 relative to a "C" clamp in a holding procedure.

Figure 14:
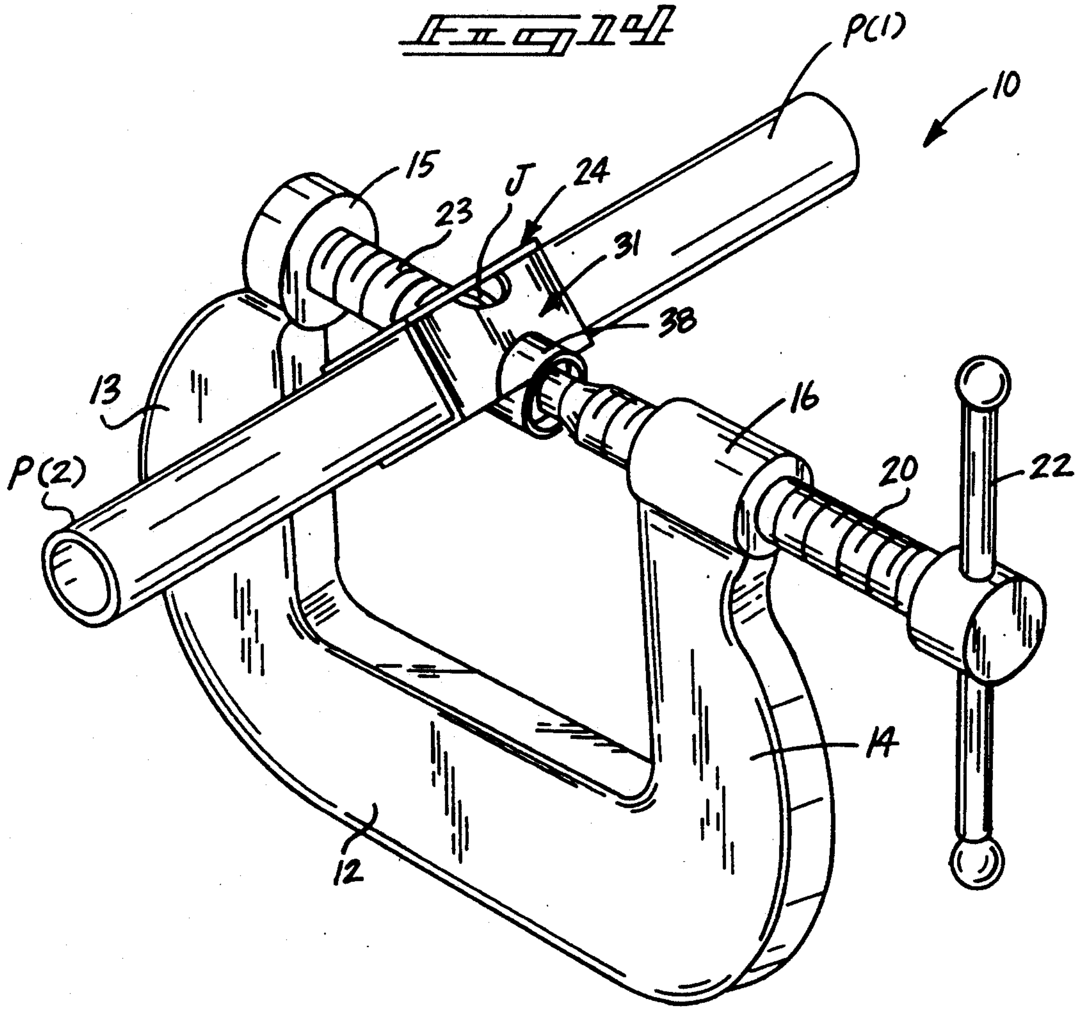
FIG. 14 is an isometric illustration of the invention in a second configuration utilizing the "V" shaped bracket clamps mounted to the "C" clamp structure.

The FIGS. 10–13 illustrate the use of a second "V" shaped bracket 31 that includes a second intersection 31a defined by an intersection of third and fourth bracket plates 32 and 33. The second intersection 31a includes a tubular socket 38 defined by a predetermined internal diameter substantially equal to the predetermined external diameter of the second threaded rod plate 21, wherein the tubular socket 38 is mounted medially of the second intersection 31a and whose axis bisects an acute included angle defined between the third and fourth bracket plates 32 and 33, with the third and fourth bracket plates 32 and 33 extending forwardly of the second intersection and the tubular socket 38. The third and fourth bracket plates 32 and 33 include respective third and fourth bracket plate side edges 34 and 35 that are arranged in a parallel and coextensive relationship and include respective third and fourth recesses 36 and 37. When the first and second respective "V" shaped brackets 24 and 31 are mounted to the respective first threaded bore 15 and to the second threaded rod plate 21, the recesses 36 and 29 are in an aligned orientation, as well as the second and fourth recesses 30 and 37 respectively. It should be noted that a slotted bracket 39 may be utilized in lieu of the socket 38 to provide for a sliding reception of the plate 21, but it should be noted that the tubular socket 38 provides for the precise alignment and positioning of the second bracket relative to the first bracket, in a manner as illustrated in FIG. 14, to position a first pipe "P" 1 to a second pipe "P" 2 at a junction "J" of the first and second "P" pipes to permit access to the junction "J" through the respectively aligned recesses, as illustrated. In this manner, a working of the junction "J" to include a myriad of mechanical and working operations is provided.

FIG. 15 illustrates a modified "V" shaped plate structure utilizing the slotted connection 39 and a swivel connection 23b for mounting the "V" shaped plate structure to a conventional clamp in cooperation with the "V" shaped bracket 31 of FIG. 14 that is reciprocatably mounted relative to the forward distal end of the clamp structure, as illustrated in FIG. 15.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pipe clamp apparatus, comprising, a "C" clamp including a central shank, the central shank including a first leg spaced from, parallel to, and coextensive with a second leg, the first and second legs mounted at opposed distal ends of the central shank, with the first and second legs arranged in an orthogonal relationship relative to the central shank, and the first leg including a first threaded bore, the second leg including a second threaded bore, and the first threaded bore and the second threaded bore are in a coaxially aligned relationship oriented orthogonally relative to the first leg and the second leg, and a first threaded rod removably mounted relative to the first threaded bore, the first threaded rod including a first threaded rod plate orthogonally mounted to a forward distal end of the first threaded rod, and a handle bar diametrically directed through the first threaded rod adjacent the first threaded plate permitting manual rotation of and removal of the first threaded rod relative to the first threaded bore, and a second threaded rod rotatably mounted within the secoond threaded bore, the second threaded rod including a second rod plate defined by a predetermined external diameter mounted at a forward distal end of the second threaded rod, and a second threaded rod handle orthogonally directed through the second threaded rod at a rear distal end of the second threaded rod, and a first "V" shaped bracket means arranged for securement to the first threaded bore, and a second "V" shaped bracket means arranged for mounting to the second threaded rod plate to clamp a plurality of pipe members therebetween.

2. An apparatus as set forth in claim 1 wherein the first "V" shaped bracket means includes a third threaded rod threadedly received within the first threaded bore when the first threaded rod is removed from the first threaded bore, wherein the first threaded rod is positioned within the first threaded bore in a first position and the third threaded rod is positioned within the first threaded bore in a second position, and the third threaded rod including a first "V" shaped bracket mounted at a forward distal end of the third threaded rod, and the first "V" shaped bracket including a first intersection, the first intersection including a first bracket plate and a second bracket plate joined together at the first intersection, and the third threaded rod orthogonally intersecting the first intersection, with the first bracket plate and the second bracket plate extending forwardly of the third threaded rod, and the first bracket plate and the second bracket plate defining an acute angle therebetween, with the first bracket plate including a first plate side edge, and the second bracket plate including a second plate side edge, wherein the first plate side edge and the second plate side edge are in parallel coextensive relationship relative to one another, and the first plate side edge includes a first recess positioned medially of the first plate side edge, and the second plate side edge includes a second recess positioned medially of the second plate side edge, and the second "V" shaped bracket means includes a third "V" shaped bracket and a fourth "V" shaped bracket joined together at a second intersection, the second intersection including a tubular socket defined by a predetermined internal diameter substantially equal to the predetermined external diameter of the second threaded rod plate to receive the second threaded rod plate therewithin in the second position, with the third bracket plate and the fourth bracket plate extending forwardly of the tubular socket, and the third bracket plate including a third bracket plate side edge and the fourth bracket plate including a fourth bracket plate side edge, wherein the third bracket plate side edge and the fourth bracket plate side edge are in a parallel coextensive relationship relative to one another, and the third bracket plate side edge includes a third recess positioned medially of the third bracket plate side edge, and the fourth bracket plate side edge including a fourth recess positioned medially of the fourth bracket plate side edge, and the first recess and the third recess are in a juxtaposed aligned relationship relative to one another in a second position, and the second recess and the fourth recess are in aligned juxtaposed relationship relative to one another in the second position.

* * * * *